US011654875B2

(12) United States Patent
Yao et al.

(10) Patent No.: US 11,654,875 B2
(45) Date of Patent: May 23, 2023

(54) REGENERATIVE BRAKING AND ANTI-LOCK BRAKING CONTROL SYSTEM

(71) Applicant: FORD GLOBAL TECHNOLOGIES, LLC, Dearborn, MI (US)

(72) Inventors: Yixin Yao, Ann Arbor, MI (US); Yanan Zhao, Ann Arbor, MI (US); Mark Steven Yamazaki, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 516 days.

(21) Appl. No.: 16/747,806

(22) Filed: Jan. 21, 2020

(65) Prior Publication Data

US 2021/0221343 A1 Jul. 22, 2021

(51) Int. Cl.
*B60T 8/1761* (2006.01)
*B60T 8/174* (2006.01)
*B60L 7/26* (2006.01)

(52) U.S. Cl.
CPC ............ *B60T 8/17616* (2013.01); *B60L 7/26* (2013.01); *B60T 8/174* (2013.01);
(Continued)

(58) Field of Classification Search
CPC .... B60L 3/108; B60L 7/10; B60L 7/26; B60L 15/2009; B60T 2240/00; B60T 2270/10; B60T 2270/602; B60T 2270/604; B60T 8/174; B60T 8/176; B60T 8/1761; B60T 8/17616
See application file for complete search history.

(56) References Cited

U.S. PATENT DOCUMENTS 5,476,310 A 12/1995 Ohtsu et al.
5,615,933 A 4/1997 Kidston et al.
(Continued)

FOREIGN PATENT DOCUMENTS

JP 2014079099 A 5/2014

OTHER PUBLICATIONS

Weng C. Adaptive model predictive control for hybrid electric vehicles power management (Year: 2013).*
(Continued)

*Primary Examiner* — Charles J Han
(74) *Attorney, Agent, or Firm* — David B. Kelley; Brooks Kushman P.C.

(57) ABSTRACT

A vehicle includes an electric machine, friction brakes, a drivetrain, and a controller. The electric machine is configured to recharge a battery during regenerative braking. The friction brakes are configured to apply torque to wheels of the vehicle to slow the vehicle. The controller is programmed to, in response to and during an anti-locking braking event, generate a signal indicative of a total torque demand to brake the vehicle based on a difference between a desired wheel slip ratio and an actual wheel slip ratio, adjust a regenerative braking torque based on a product of the signal and a regenerative braking weighting coefficient, adjust a friction braking torque based on a product of the signal and a friction braking weighting coefficient, and further adjust the regenerative braking torque based on a closed-loop control of an estimated regenerative braking torque feedback.

20 Claims, 5 Drawing Sheets

(52) U.S. Cl.
CPC ....... *B60T 2240/00* (2013.01); *B60T 2270/10* (2013.01); *B60T 2270/602* (2013.01); *B60T 2270/604* (2013.01)

(56) References Cited

U.S. PATENT DOCUMENTS

| | | | |
|---|---|---|---|
| 6,231,134 B1 | 5/2001 | Fukasawa et al. | |
| 6,709,075 B1 | 3/2004 | Crombez et al. | |
| 7,152,934 B2 | 12/2006 | Fuhrer et al. | |
| 7,794,026 B2 | 9/2010 | Nakayama et al. | |
| 9,193,339 B2 | 11/2015 | Yao et al. | |
| 9,586,488 B2 | 3/2017 | Nakaoka et al. | |
| 10,399,440 B2 | 9/2019 | Zhao et al. | |
| 10,723,229 B1 | 7/2020 | Yao et al. | |
| 2006/0138859 A1 | 6/2006 | Nakayama et al. | |
| 2007/0046099 A1 | 3/2007 | Matsuura et al. | |
| 2009/0187320 A1* | 7/2009 | Antanaitis | B60L 3/0076 701/70 |
| 2012/0138375 A1 | 6/2012 | Hughes | |
| 2012/0280562 A1* | 11/2012 | Wu | B60T 8/174 701/77 |
| 2015/0149056 A1 | 5/2015 | Yao et al. | |
| 2015/0274159 A1 | 10/2015 | Lu et al. | |
| 2016/0096434 A1 | 4/2016 | Nakaoka et al. | |
| 2016/0214486 A1* | 7/2016 | Suzuki | B60L 50/52 |
| 2016/0264111 A1 | 9/2016 | Doi et al. | |
| 2018/0093571 A1 | 4/2018 | Hall et al. | |
| 2018/0154777 A1 | 6/2018 | Hall et al. | |
| 2018/0264949 A1 | 9/2018 | Kaneko et al. | |
| 2018/0354495 A1 | 12/2018 | Kumazaki et al. | |
| 2018/0361856 A1 | 12/2018 | Zhao et al. | |
| 2019/0039450 A1 | 2/2019 | Baba et al. | |
| 2021/0053448 A1 | 2/2021 | Beck et al. | |
| 2021/0086623 A1 | 3/2021 | Yao et al. | |
| 2021/0221343 A1 | 7/2021 | Yao et al. | |
| 2021/0237614 A1 | 8/2021 | Yao et al. | |

OTHER PUBLICATIONS

Reif K. (Ed), "Brakes, Brake Control and Advanced Driver Assistance Systems", Springer Verlag, 2014, 14 pages.

Wen-Po Chiang, et al., "Integrated Slip-Based Torque Control of Antilock Braking System for In-Wheel Motor Electric Vehicle", IEE Journal of Industry Applications, vol. 3, No. 4, pp. 318-327, 2014, 10 pages.

Dzmitry Savitski et al., "The New Paradigm of Anti-Lock Braking System for Full Electric Vehicle: Experimental Investigation and Benchmarking", Proceedings of the Institution of Mechanical Engineers Part D Journal of Automobile Engineering, Oct. 2015, 14 pages.

S. A. Oleksowicz et al., "Investigation of Regenerative and Anti-Lock Braking Interaction", International Journal of Automotive Technology, vol. 14, No. 4, pp. 641-650 (2013), 10 pages.

Oleksowicz, Selim, et al. "Regenerative braking control for high level deceleration on low mu surface." SAE International Journal of Alternative Powertrains 4.1 (2015): 209-224.

Oleksowicz, Selim, Keith Burnham, and Andrzej Gajek. "On the legal, safety and control aspects of regenerative braking in hybrid/electric vehicles." Czasopismo Techniczne. Mechanika 109.3-M (2012): 139-155.

Ivanov, Valentin, et al. "Design and testing of ABS for electric vehicles with individually controlled on-board motor drives." SAE International Journal of Passenger Cars-Mechanical Systems 7.2014-01-9128 (2014): 902-913.

R. Kubaisi, "Adaptive Regenerative Braking in Electric Vehicles", Ph.D. Thesis, Karlsruher Institut für Technologie (KIT), Dec. 2018.

49 CFR Part 571 PART 571, 49 CFR 571.135—Standard No. 135; Light vehicle brake systems. Federal Motor Vehicle Safety Standards.

European Directive 71/320/EEC. Council Directive 2006/96/EC of 20, Nov. 2006, L 363 81.

ECE 13-H. Passenger cars with regards to braking. United Nations Rev.2/Add.12H/Amend. 4 of 6, Aug. 2007.

Oleksowicz, Selim, et al. "Legal, Safety and Practical Regenerative Braking Control Challenges." Measurement and Control 46.9 (2013): 283-288.

Khaleghian, Seyedmeysam, Anahita Emami, and Saied Taheri. "A technical survey on tire-road friction estimation." Friction 5.2 (2017): 123-146.

Oleksowicz, Selim A., et al. "Regenerative braking strategies, vehicle safety and stability control systems: critical use-case proposals." Vehicle System Dynamics 51.5 (2013): 684-699.

Fuentes, L.V., Regenerative Braking Systems, Universidad Pontificia Comillas ICAI-ICADE, May 2014.

* cited by examiner

REGENERATIVE BRAKING AND ANTI-LOCK BRAKING CONTROL SYSTEM

TECHNICAL FIELD

The present disclosure relates to hybrid/electric vehicles and methods of controlling regenerative braking in hybrid/electric vehicles.

BACKGROUND

Regenerative braking is a feature of hybrid vehicles that improves fuel economy by recapturing kinetic energy when the vehicle slows down during a braking event. During regenerative braking, an electric machine may operate as a generator to convert the kinetic energy of the vehicle into electrical energy which is in turn used to charge a battery.

SUMMARY

A vehicle includes an electric machine, friction brakes, a drivetrain, and a controller. The electric machine is configured to recharge a battery during regenerative braking. The friction brakes are configured to apply torque to wheels of the vehicle to slow the vehicle. The drivetrain has a transmission. The controller is programmed to, in response to and during an anti-locking braking event, generate a signal indicative of a total torque demand to brake the vehicle based on a difference between a desired wheel slip ratio and an actual wheel slip ratio; adjust a regenerative braking torque of the electric machine based on a product of the signal and a regenerative braking weighting coefficient and a pre-compensator to maintain or drive actual wheel slip at or toward the desired wheel slip; adjust a friction braking torque of the friction brakes based on a product of the signal and a friction braking weighting coefficient to maintain or drive actual wheel slip at or toward the desired wheel slip; further adjust the regenerative braking torque of the electric machine based on a closed-loop control to compensate driveline dynamics and to maintain or drive actual wheel slip at or toward the desired wheel slip, wherein the closed loop control includes adjusting the regenerative braking torque based on a difference between the product of the signal and the regenerative braking weighting coefficient and the pre-compensator, and an estimated regenerative braking torque, and adjusting the regenerative braking torque of the electric machine based on a regenerative braking torque controller block to compensate driveline dynamics; and further adjust the regenerative braking torque of the electric machine based on a feed-forward compensator to maintain or drive actual wheel slip at or toward the desired wheel slip, wherein the feed-forward compensator is based on transfer functions that represent dynamics of the electric machine, dynamics of the friction brakes, and dynamics of the drivetrain and transmission of the vehicle.

A vehicle includes an axle, wheels, an electric machine, friction brakes, and a controller. The axle has an input shaft to an open differential and output shaft extending out of the open differential. The wheels are secured to each output shaft. The electric machine is secured to the input shaft and is configured to slow the vehicle during regenerative braking. The friction brakes are disposed about the wheels and are configured to slow the vehicle. The controller is programmed to, in response to and during an anti-locking braking event, generate a signal indicative of a total torque demand to brake the vehicle based on a difference between a desired wheel slip ratio and an actual wheel slip ratio; adjust a regenerative braking torque of the electric machine based on a product of the signal and a first weighting coefficient and a pre-compensator during the anti-lock braking event to maintain or drive actual wheel slip at or toward the desired wheel slip; adjust a friction braking torque of the friction brakes based on a product of the signal and a second weighting coefficient during the anti-lock weighting event to maintain or drive actual wheel slip at or toward the desired wheel slip; further adjust the regenerative braking torque based on a closed-loop control that includes regenerative braking torque compensation control block and a feedback control to maintain or drive actual wheel slip at or toward the desired wheel slip; and further adjust the regenerative braking torque of the electric machine based on a feed-forward compensator to maintain or drive actual wheel slip at or toward the desired wheel slip.

A vehicle includes an electric machine, friction brakes, a drivetrain, and a controller. The electric machine is configured to recharge a battery during regenerative braking. The friction brakes are configured to apply torque to wheels of the vehicle to slow the vehicle. The controller is programmed to, in response to and during an anti-locking braking event, generate a signal indicative of a total torque demand to brake the vehicle based on a difference between a desired wheel slip ratio and an actual wheel slip ratio, adjust a regenerative braking torque of the electric machine based on a product of the signal and a regenerative braking weighting coefficient and the pre-compensator to maintain or drive actual wheel slip at or toward the desired wheel slip, adjust a friction braking torque of the friction brakes based on a product of the signal and a friction braking weighting coefficient to maintain or drive actual wheel slip at or toward the desired wheel slip, and further adjust the regenerative braking torque of the electric machine based on a closed-loop control to maintain or drive actual wheel slip at or toward the desired wheel slip.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
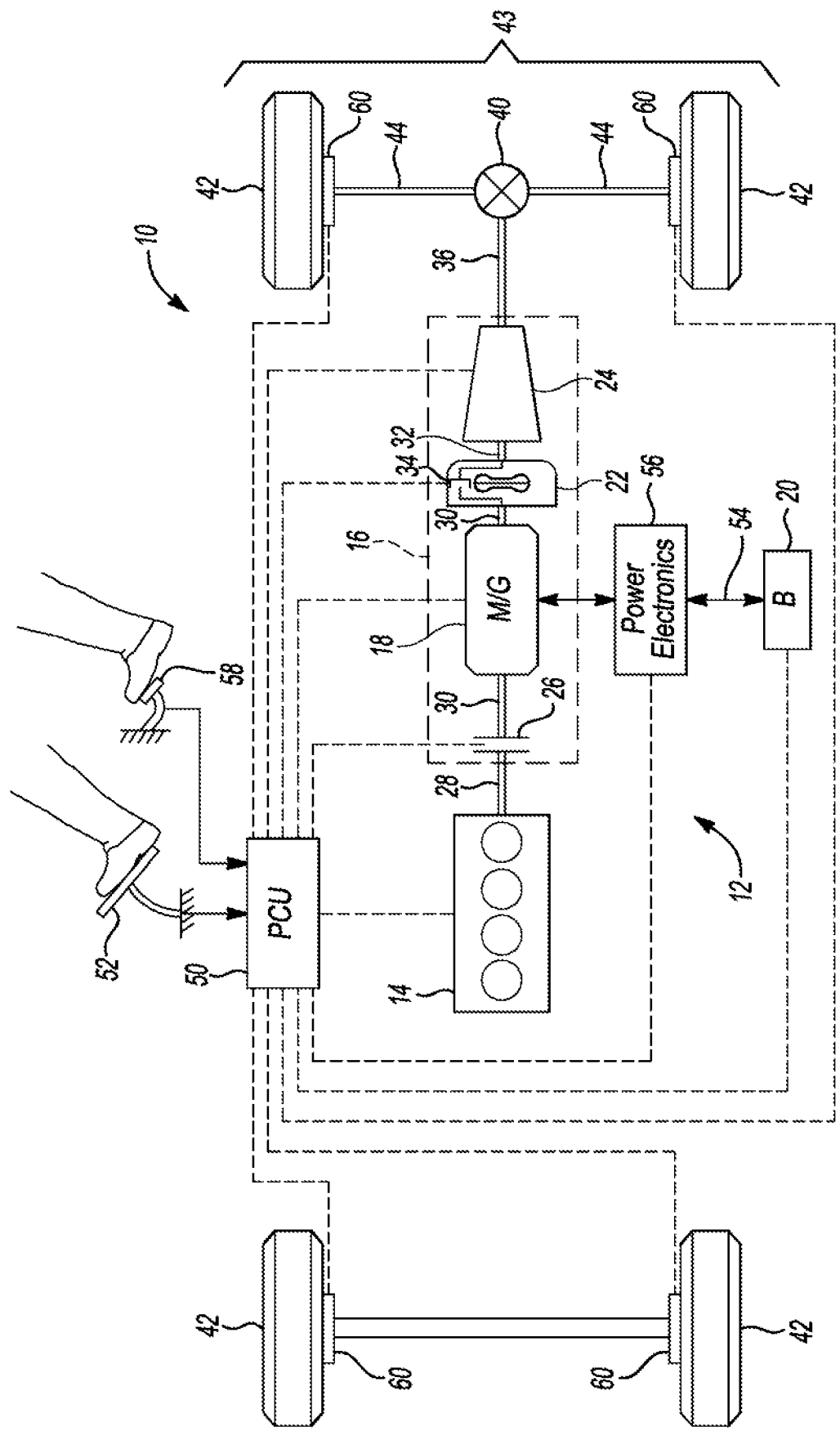
FIG. 1 is a schematic illustration of an exemplary powertrain of a hybrid/electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16. As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the MG 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). For example, the gearbox 24 may be upshifted from a lower gear to a higher gear (e.g., from $3^{rd}$ gear to $4^{th}$ gear) during acceleration or may be downshifted from a higher gear to a lower gear (e.g., from $5^{th}$ gear to $4^{th}$ gear) when the vehicle is slowing down. Power and torque from both the engine 14 and the M/G 18 may be delivered to and received by gearbox 24. The gearbox 24 then provides powertrain output power and torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shill forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective half shaft 44 connected to the differential 40. The differential 40 may be an open differential. The transmission output shaft 36 may also be referred to as an input shaft to the differential 40 and the half shafts 44 may be referred to as an output from the differential. Shaft 36, differential 40, half shafts 44 and a pair of the wheels 42 may form an axle 43. The vehicle may also include a second pair of wheels 42 that are not part of axle 43. The differential transmits approximately equal torque to each wheel 42 while permitting slight speed differences such as when the vehicle turns a corner. Each of the wheels 42 have tires that contact the road surface to propel the HEV 10. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (RAM), for example. RAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input-output (I/O) interface (including input and output channels) that may be implemented as a single integrated interlace that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M-G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the FO interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for case of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the accelerator pedal 52 generates an accelerator pedal position signal that may be interpreted by the controller 50 as a demand for increased power or decreased power, respectively. A brake pedal 58 is also used by the driver of the vehicle to provide a demanded braking torque to slow the vehicle. In general, depressing and releasing the brake pedal 58 generates a brake pedal position signal that may be interpreted by the controller 50 as a demand to decrease the vehicle speed. Based upon inputs from the accelerator pedal 52 and brake pedal 58, the controller 50 commands the torque to the engine 14, M/G 18, and friction brakes 60, which may be disposed about each wheel 42. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft

30. This operation mode may be referred to as a "hybrid mode" or an "electric assist mode."

To drive the vehicle with the MG 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the MG 18. The controller 50 commands the power electronics 56 to convert voltage from the battery 20 to an AC voltage provided to the MG 18 to provide positive or negative torque to the shaft 30. This operation mode may be referred to as an "electric only" or "EV" operation mode.

In any mode of operation, the MG 18 may act as a motor and provide a driving force for the powertrain 12. Alternatively, the M/G 18 may act as a generator and convert kinetic energy from the powertrain 12 into electric energy to be stored in the battery 20. The MG 18 may act as a generator while the engine 14 is providing propulsion power for the vehicle 10, for example. The M/G 18 may additionally act as a generator dining times of regenerative braking where the MG 18 is utilized to slow the HEV 10. During regenerative braking torque and rotational energy or power from spinning wheels 42 is transferred back through the gearbox 24, torque converter 22, (and/or torque converter bypass clutch 34) and is converted into electrical energy for storage in the battery 20.

Referring to FIG. 1, a schematic diagram representative of a vehicle 10 and a vehicle powertrain 12 is illustrated. The powertrain 12 includes power generating components (e.g., engines or electric motors) and the drivetrain. The drivetrain is the group of components that deliver power to the driving wheels (e.g., gearbox 24, shaft 36, differential 40, and half shafts 44), excluding the power generating components. In contrast, the powertrain 12 is considered to include both the power generating components and the drivetrain. The powertrain 12 includes an engine 14 and a transmission 16. The transmission 16 may be configured to provide multiple gear ratios between an input and an output of the transmission 16. The engine 14 is connected to the input of the transmission 16 while drivetrain components that are configured deliver power to driving wheels 18 are connected to an output shaft 20 of the transmission 16. The engine 14 may be connected to the input of the transmission by a torque converter or a launch clutch.

It should be understood that the schematic illustrated in FIG. 1 is merely exemplary and is not intended to be limiting. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

For example, the configuration may include a single electric machine (e.g., M/G 18) that is connected to an open differential (e.g., differential 40) through an input shaft to the differential (i.e., shaft 36) and may include first and second wheels (i.e., wheels 42) that are each secured to one of the two output shafts of the open differential (i.e., half shafts 44). In this example, the open (or unlocked) differential is configured to provide the same torque (rotational force) to each of the half shafts and their respective wheels. A transmission (e.g., gearbox 24) and/or torque converter (e.g., torque converter 22) may be disposed between the electric machine and the open differential in this example configuration.

It should be understood that the vehicle configuration described herein is merely exemplary and is not intended to be limited. Other electric or hybrid vehicle configurations should be construed as disclosed herein. Other vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other electric or hybrid vehicle configuration known to a person of ordinary skill in the art.

Regenerative braking toque may be interpreted as a disturbance in an anti-lock braking control system. Therefore, utilizing existing regenerative braking control strategies for vehicles equipped with a single axle electric motor and open differential (e.g., FIG. 1) during an anti-lock braking event may degrade anti-lock braking performance and may cause possible wheel slip, which affects vehicle dynamics and stability.

A unified control architecture, which may be referred to as the variable 2-1 conversion or variable 3-2 conversion with driveline dynamic compensation in open-loop, may be utilized to control both regenerative braking and friction braking during an anti-lock braking event. Such a control architecture converts regenerative braking torque into an effective control variable such that regenerative braking is no longer a disturbance to the anti-lock braking control system. Such a unified control architecture is described in U.S. patent application Ser. No. 16/576,274 filed on Sep. 19, 2019, the disclosure of which is hereby incorporated in its entirety by reference herein.

Figure 2:
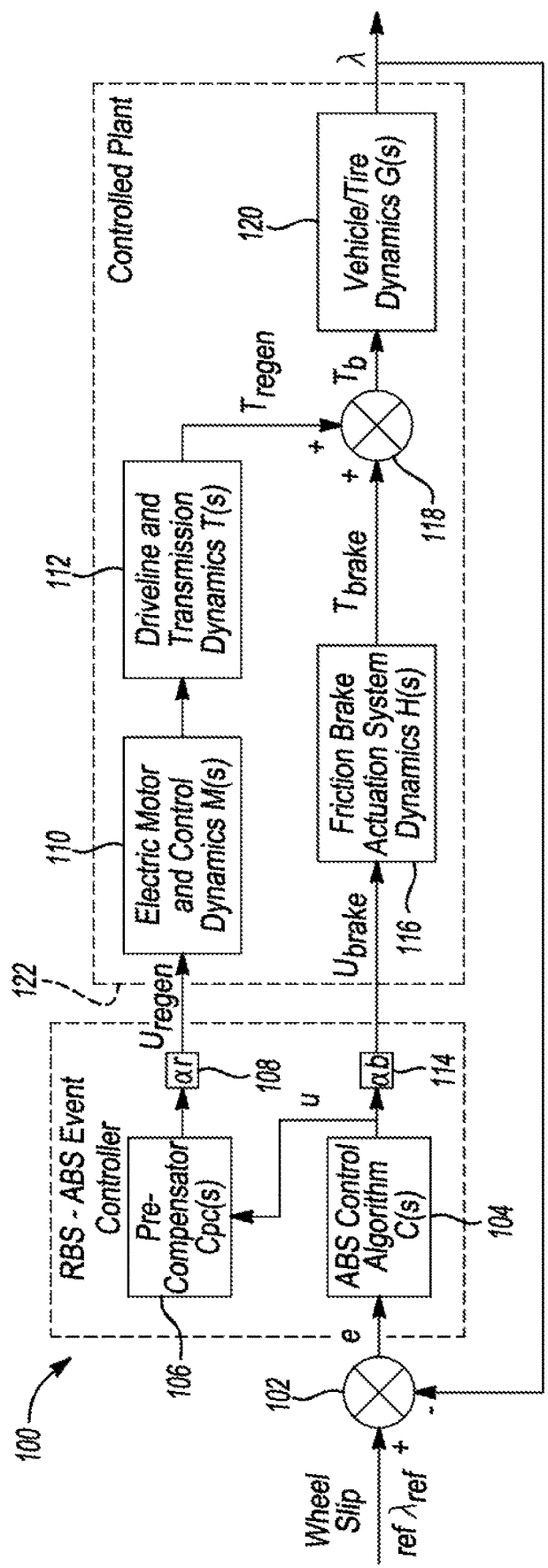
FIG. 2 is a block diagram illustrating an RBS-ABS event control system with direct driveline dynamic compensation based on open loop control.

An example of such a unified control architecture, which may be referred to as the RBS-ABS event control system, is illustrated in FIG. 2. Specifically, FIG. 2 includes a block diagram of a vehicle braking control system where the regenerative braking torque and friction brake torque are both controlled based on a common control signal u. As illustrated in FIG. 2, the controlled plant consists of the vehicle and tire dynamics G(s), the friction brake dynamics H(s), the driveline and transmission dynamics T(s), and electric motor dynamics the M(s). G(s), H(s), T(s), and M(s) all represent the transfer functions of their respective dynamic systems. The output variable of the controlled plant is road wheel slip $\lambda$. The input variables to the controlled plant are $u_{brake}$ to generate friction braking torque $T_{brake}$, and $u_{regen}$ to generate regenerative braking torque $T_{regen}$.

The RBS-ABS controller represented in FIG. 2 includes an anti-lock braking system (ABS) controller C(s) and control variable u, which is output from the ABS controller C(s). An ABS controller is described in U.S. patent application Ser. No. 16/355,084 filed on Mar. 15, 2019, the disclosure of which is hereby incorporated in its entirety by reference herein. Control variable u is split into two output channels: friction braking control channel with control output variable $u_{brake}$, and regenerative braking control channel with control output variable $u_{regen}$, which are then weighted by the coefficients $\alpha_b$ and $\alpha_r$ respectively. The regenerative braking control channel also includes a pre-compensator $C_{pc}(s)$ which compensates the driveline dynamics. Control variable u is a common variable for $u_{brake}$ and $u_{regen}$, which are the friction braking torque control input and regenerative braking torque control input, respectively. More specifically, u may be representative of a signal that is indicative of a total torque demand, while $u_{brake}$ and $u_{regen}$ may be representative of signals indicative of a friction brake torque demand and a regenerative braking torque demand, respectively.

When only ABS control is considered without regenerative control channel from u to $u_{regen}$ ($C_{pc}(s)=0$, $\alpha_r=0$, and $\alpha_b=1$), that is, without RBS-ABS event control, the transfer function of the controlled plant from the two input control variables $u_{brake}$ and $u_{regen}$ to the road wheel slip output variable $\lambda$ is expressed as equation (1):

$$\lambda(s)=G(s)H(s)u_{brake}(s)+G(s)M(s)T(s)u_{regen}(s) \quad (1)$$

The closed loop transfer function of a conventional ABS system may be expressed as equation (2):

$$\lambda(s) = \frac{C(s)H(s)G(s)}{1+C(s)H(s)G(s)}\lambda_{ref}(s) + \frac{M(s)T(s)G(s)}{1+C(s)H(s)G(s)}u_{regen}(s) \quad (2)$$

The first item of equation (2) is the closed loop transfer function of the ABS control system with the wheel slip as an input $\lambda_{ref}$. The second item is the transfer function from regenerative brake torque open loop control variable with $u_{regen}$ as an input, which may act as an external disturbance for the ABS feedback control loop shown as the first item in equation (2).

The RBS-ABS event controller in FIG. 2 allows the system to control both regenerative braking and friction braking during anti-lock braking event by converting the regenerative braking torque control variable $u_{regen}$ from a disturbance variable, which would occur if the system were designed according to equation (2), to an effective control variable with the following variable conversion, which may be referred to as the variable 2-1 conversion. The regenerative braking torque control variable $u_{regen}$ and the friction braking torque control variable $u_{brake}$ and may be represented by equations (3)-(4) according to the variable 2-1 conversion:

$$u_{regen}(s)=C_{pc}(s)\alpha_r u(s) \quad (3)$$

$$u_{brake}(s)=\alpha_b u(s) \quad (4)$$

The pre-compensator may be described according to equation (5):

$$C_{pc}(s) = \frac{H(s)}{M(s)T(s)} \quad (5)$$

The weighting coefficients should satisfy equation (6):

$$\alpha_b+\alpha_r=1 \quad (6)$$

Substituting equations (3)-(5) into equation (2) converts the closed loop transfer function of the ABS control system into an ABS control system where regenerative braking is no longer a disturbance to the ABS control system, which may be represented by equation (7):

$$\lambda(s) = \frac{C(s)H(s)G(s)}{1+C(s)H(s)G(s)}\lambda_{ref}(s) \quad (7)$$

As shown in FIG. 2, the RBS-ABS event controller with variable 2-1 conversion integrates the friction braking control and regenerative braking control into a unified framework, which is an extended ABS control with two output channels: a regenerative braking channel and a friction braking channel. Specifically, FIG. 2 show's a block diagram 100 of the RBS-ABS event control system described by equation (7) with the pre-compensator of equation (5) and the conversion of equations (3) and (4), which represent a variable 2-1 conversion to convert regenerative braking torque from disturbance to one of the control torques. In FIG. 2, the difference e between the actual wheel slip $\lambda$ and the desired wheel slip $\lambda_{ref}$ is determined at subtraction block 102. The difference e is then input into the ABS controller C(s) at block 104. The ABS controller then outputs u, which may be representative of a signal that is indicative of a total torque demand. The signal u is adjusted by the pre-compensator $C_{pc}(s)$ at block 106 and the regenerative braking weighting coefficient $\alpha_r$ at block 108 to produce the signal $C_{pc}(s)$ that is indicative of the regenerative braking torque demand. More, specifically, the signal u may be multiplied by the regenerative braking weighting coefficient $\alpha_r$ at block 108 and pre-compensator $C_{pc}(s)$ at block 106_to produce the signal $u_{regen}$ that is indicative of the regenerative braking torque demand. The signal $u_{regen}$ is then adjusted according to the electric motor and the electric motor controller dynamics transfer function M(s) at block 110 and the axial driveline and transmission dynamics transfer function T(s) at block 112 to produce the regenerative braking toque $T_{regen}$.

The signal u is also adjusted by the friction braking weighting coefficient $\alpha_b$ at block 114 to produce the signal $u_{brake}$ that is indicative of the friction braking torque demand. More, specifically, the signal u may be multiplied by the friction braking weighting coefficient $\alpha_b$ at block 114 to produce the signal $u_{brake}$ that is indicative of the friction braking torque demand. The signal $u_{brake}$ is then adjusted according to the friction brake actuation system dynamics transfer function H(s) at block 116 to produce the friction braking toque $T_{brake}$. The regenerative braking toque $T_{regen}$ and the friction braking toque $T_{brake}$, are then added together at summation block 118 to produce the total brake torque $T_b$. The total brake torque $T_b$ is then delivered to the vehicle and tire dynamics at block 120, which is represented by G(s). Block 120 then outputs the actual wheel slip $\lambda$, which is then fed back to subtraction block 102. The controlled plant 122 includes the electric motor and electric motor controller dynamics M(s), the axial driveline and transmission dynamics T(s), the friction brake actuation system dynamics transfer function H(s), summation block 118, and the vehicle and tire dynamics G(s) at block 120.

The RBS-ABS event control system described by equation (7) and illustrated by block diagram 100 in FIG. 2 is configured to adjust both the regenerative braking toque $T_{regen}$ and friction braking toque $T_{brake}$ to maintain or drive the actual wheel slip $\lambda$ at or toward the desired wheel slip $\lambda_{ref}$ while also maximizing the amount of regenerative braking toque $T_{regen}$. The RBS-ABS event control system described by equation (7) and illustrated by block diagram 100 may be activated in response to and/or during an anti-lock braking event.

From equation (7) and FIG. 2, it can be observed that the RBS-ABS event control system 100 integrates friction brake control and regenerative braking control into a unified framework. In other words, the regenerative braking control input $u_{regen}(s)$ and friction brake control input $u_{brake}(s)$ are integrated with the friction brake control variable u, which is the ABS controller 104 output, so that the two torque control inputs, $u_{regen}(s)$ and $u_{brake}(s)$, are controlled by a common torque control input variable u. By integrating $u_{regen}(s)$ and $u_{brake}(s)$ with the friction brake control variable u, the RBS-ABS event control system 100 can satisfy the stability and performance of RBS-ABS event control system similar to a traditional ABS system that only controls friction brakes.

It is noticed that the dynamics are same for regenerative braking control loop and friction braking control loop in the RBS-ABS event control system 100. The portion of the torque command output u of the ABS controller 104 that is directed to the friction brakes $u_{brake}$ is taken over by the regenerative braking torque control $u_{regen}$ in the RBS-ABS event control strategy of FIG. 2. The ratio of regenerative braking torque and friction braking torque is represented by equation (6). Therefore equation (6) determines how much regenerative braking torque is delivered. When the friction braking torque coefficient $\alpha_b$ is 1 and the regen braking torque coefficient $\alpha_r$ is 0, then only friction braking torque is delivered, and the RBS-ABS event controller 100 functions similar to a traditional ABS system that only controls friction brakes. When $\alpha_b$ is 0 and $\alpha_r$ is 1, only regenerative braking torque is delivered. When $\alpha_b$ is 0.5 and $\alpha_r$ is 0.5, 50% friction braking torque and 50% regen braking torque are delivered at the same time. In other words, both the regenerative brake control loop and the friction brake control loop deliver the ABS controller 104 output u to generate the total braking torque.

It can be seen that the role of pre-compensator $C_{pc}(s)$ in equation (5) is to compensate for the driveline, transmission, and electric motor dynamics M(s)T(s). The transfer function in the regenerative brake channel (which converts the control variable u to regenerative braking torque $T_{regen}$) of FIG. 2 may be represented by equation (8):

$$T_{regen} = \alpha_r C_{pc}(s)M(s)T(s)u = \alpha_r \frac{H(s)}{M(s)T(s)}M(s)T(s)u = \alpha_r H(s)u \quad (8)$$

As a result, the pre-compensator is reduced to $\alpha_r H(s)$ and the regenerative brake channel has similar dynamics with that of the friction brake channel $\alpha_b H(s)u$, the only difference being the coefficient $\alpha_b$. Thus, the RBS-ABS event control may be realized by using the ABS controller C(s).

The driveline dynamic compensation is important for the RBS-ABS event control system because it determines whether the regenerative braking torque can be completely converted to an effective control variable. The open loop compensation based direct cancellation in (8) may be difficult to fully achieve, particularly for actual systems whose driveline dynamics has nonlinearity, underdamping characteristics, possible driveline resonance and oscillation. The actual driveline also has uncertainties causing unexpected dynamics. In addition, developing analytical models and/or parameter identification of the models for pre-compensator $C_{pc}(s)$ implementation is time consuming. To address this problem, a closed-loop based driveline dynamic compensation method for the RBS-ABS event control system may be utilized. The closed-loop based driveline dynamic compensation method may improve driveline dynamics compensation while avoiding the modeling or system identification of the driveline dynamics.

Figure 3:
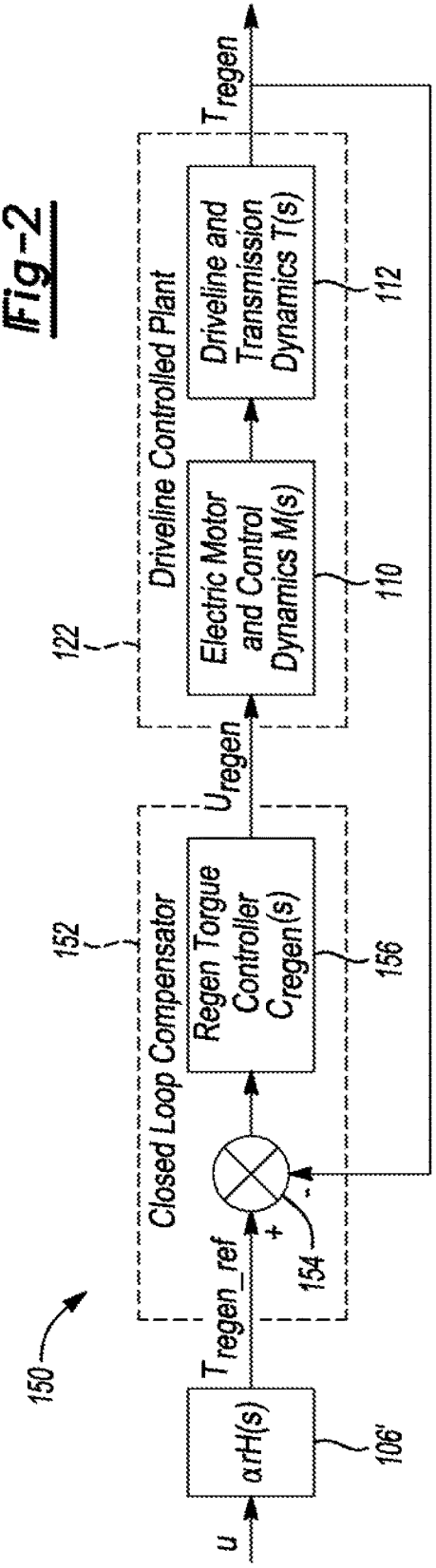
FIG. 3 is a block diagram illustrating a closed-loop driveline dynamic compensation system that includes a feedback control.

A closed-loop driveline dynamic compensation system 150 that includes a feedback control is illustrated in FIG. 3. It should be noted that FIG. 3 may represent a modified version of the regenerative braking control channel of the RBS-ABS event control system 100 depicted in FIG. 2 (i.e., blocks 106, 108, 110, and 112). If the regenerative braking torque can be measured directly, the closed-loop driveline dynamic compensation system 150 may use a closed loop driveline compensator 152 to compensate for the driveline dynamics when converting control variable u to the regenerative braking torque $T_{regen}$ that is output from the closed-loop driveline dynamic compensation system 150, as shown in FIG. 3. The closed loop compensator 152 is configured to adjust a reference torque $T_{regen-ref}$ that is being output from the reduced version of the pre-compensator 106' via subtraction block 154 and via regenerative braking torque controller 156 to compensate driveline dynamics. The regenerative braking torque controller 156 may also be referred to as regenerative braking torque compensation control block. Subtraction block 154 determines a difference between the reference torque $T_{regen-ref}$ that is being output from the pre-compensator 106 and the regenerative braking torque $T_{regen}$ that is output from the closed-loop driveline dynamic compensation system 150. The difference between $T_{regen-ref}$ and $T_{regen}$ is then input into the regenerative braking torque compensation controller 156, which outputs control variable $u_{regen}$.

Comparing FIG. 3 and the regenerative braking channel in FIG. 2 (i.e., blocks 106, 108, 110, and 112), the closed-loop driveline dynamic compensation system 150 is used to replace the original open-loop based compensation (i.e., pre-compensator 106). As shown in FIG. 3, the regenerative braking torque compensation controller 156, which has a transfer function $C_{regen}(s)$, is applied to compensate for the controlled driveline, transmission, and electric motor dynamics M(s)T(s). The transfer function for the closed-loop driveline compensation system may be represented by equation (9):

$$T_{regen}(s) = \frac{C_{regen}(s)M(s) * T(s)}{1 + C_{regen}(s)M(s) * T(s)} \alpha_r H(s)u(s) \quad (9)$$

According to basic concepts of the ideal closed loop control systems, the regenerative braking torque controller $C_{regen}(s)$ can be designed to satisfy the following equation (10) in the steady states (s=0):

$$\frac{C_{regen}(s)M(s) * T(s)}{1 + C_{regen}(s)M(s) * T(s)} = 1 \quad (10)$$

Thus the transfer function in the regenerative braking channel from the control variable u to the actual regen braking torque $T_{regen}$ may be rewritten as equation (11):

$$T_{regen}(s) = \alpha_r H(s)u(s) \quad (11)$$

Therefore, according to equation (11), the regenerative braking torque $T_{regen}$ will have exactly the same dynamics as that of friction brake channel from the control variable u to the friction braking torque $T_{brake}$, other than the coefficient $\alpha_b$. The dynamics as that of friction brake channel from the control variable u to the friction braking torque $T_{brake}$ may be represented by equation (12):

$$T_{brake}(s) = \alpha_b H(s)u(s) \quad (12)$$

Thus, the goal of RBS-ABS event control is to control both the regenerative braking channel and friction braking channel using a common control variable u(s) is achieved based on the regenerative braking torque closed loop control shown in FIG. 3. For real systems, an estimated regenerative braking torque $\hat{T}_{regen}$ may be used to replace the actual regenerative braking torque $T_{regen}$, because the actual regen braking torque $T_{regen}$ cannot be measured directly in current HEVs and EVs. Thus, the following closed-loop based feedback compensation architecture is proposed.

Figure 4:
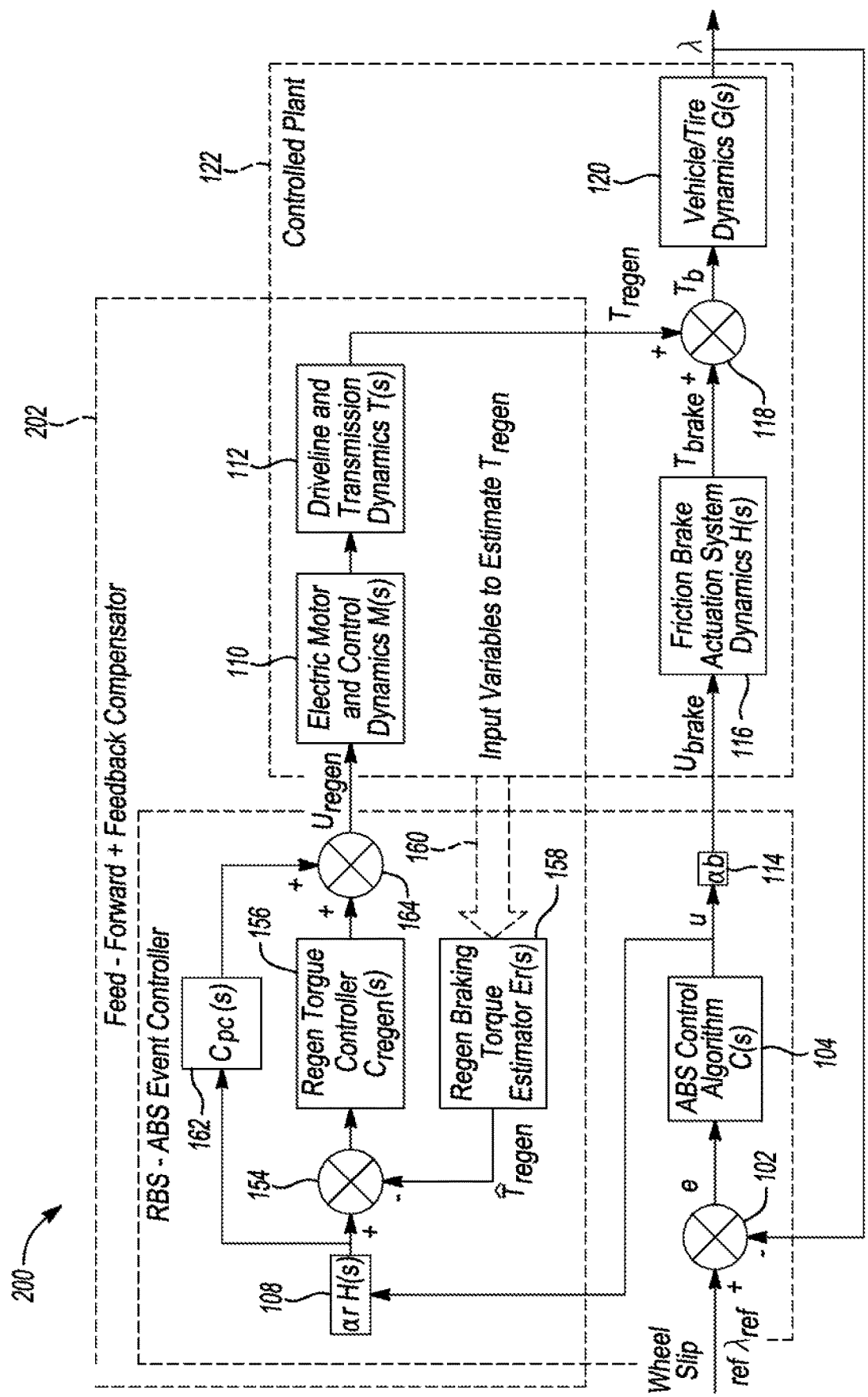
FIG. 4 is a block diagram illustrating an RBS-ABS event control system with closed-loop driveline dynamics compensation.

Referring to FIG. 4, a block diagram of the RBS-ABS event control system 200 is illustrated. The RBS-ABS event control system 200 is similar to the RBS-ABS event control system 100 depicted in FIG. 2. The regenerative braking control channel of the RBS-ABS event control system 200, however, includes a closed-loop driveline dynamic compensation system 202 that includes regenerative torque feedback control. The closed-loop driveline dynamic compensation system 202 may also include a feed-forward control.

In FIG. 4, a regenerative braking torque estimator 158, which may be represented by transfer function E/s), is utilized to generate an estimated regenerative braking torque $\hat{T}_{regen}$, which is used to estimate the actual regenerative braking torque $T_{regen}$. The input variables for the estimator come from the controlled plant 122 as indicated by arrow 160. The estimated regenerative braking torque $\hat{T}_{regen}$ may be obtained based on different input variables, such as the electrical current of the M/G 18, the speed of the vehicle 10, the speed of the wheels 42, etc.

By designing controller $C_{regen}(s)$ and estimator $E_r(s)$ for the closed-loop driveline dynamic compensation system 202 with the estimated regenerative braking torque $\hat{T}_{regen}$ feedback as shown in FIG. 4, the transfer function from the control variable u to the actual regen braking torque $T_{regen}$ can approximately satisfy equation (11). As a result, the goal of driveline dynamic compensation is achieved, and regenerative braking torque and friction braking torque can be controlled by using the same anti-lock braking controller (e.g., ABS controller 104) without any conflicts between regenerative braking torque and friction braking torque. The closed-loop based driveline dynamic compensation system 202 is configured to adjust the regenerative braking torque control variable $u_{regen}$ and track the product of control variable u and pre-compensator block 108 including weighting coefficient $\alpha_r$ and transfer function H(s) via subtraction block 154 and via the regenerative braking torque compensation controller 156. Subtraction block 154 determines a difference between the product of control variable u and pre-compensator block 108 including weighting coefficient $\alpha_r$ and transfer function H(s) and the estimated regenerative braking torque $\hat{T}_{regen}$ that is output from the regenerative braking torque estimator 158. The difference between the product of control variable u and pre-compensator block 108 including weighting coefficient $\alpha_r$ and transfer function H(s) and the estimated regenerative braking torque $\hat{T}_{regen}$ is then input into the regenerative braking torque compensation controller 156, which outputs control variable $u_{regen}$. The variable $u_{regen}$ is then delivered to the electric motor and control dynamics transfer function M(s) at block 110 and the driveline and transmission transfer function T(s) at block 112 to produce the actual regenerative braking torque $T_{regen}$. It should be noted that this control method may be slightly different if the feed-forward compensator 162 and summation block 164, described below, are included in the closed-loop driveline dynamic compensation system 202.

The different control design methods may be used to design the regenerative braking torque compensation controller 156, $C_{regen}(s)$, of the closed loop driveline compensation system 202 with a controlled driveline plant M(s)T(s) including nonlinearity and uncertainty and driveline compliances, shown in FIG. 4. For example, the regenerative braking torque compensation controller 156 may be a PID controller, an adaptive and optimal control controller, an adaptive model predictive control controller, a fuzzy logic controller, or a neural network controller. Any control architecture, such as direct output feedback from an estimated regenerative brake torque $\hat{T}_{regen}$, observer or Kalman filter based optimal control, model reference adaptive control, may be utilized to design the regenerative braking torque compensation controller 156.

To estimate the actual regenerative braking torque $T_{regen}$, the estimator $E_r(s)$ may be designed by using an existing robust slate estimator/observer and disturbance observer. For example, to estimate $T_{regen}$, using an observer $$\hat{T}_{regen} \frac{1}{G(s)} \lambda - H(s) u_{brake}$$

with the known input friction braking torque control variable $u_{brake}$ and wheel slip $\lambda$, according to the transfer function $\lambda = G(s)(T_{regen} + H(s) u_{brake})$ in FIG. 4. It also can be directly calculated by using the estimated motor toque, and/or transmission, driveline, and tire parameters. For example, estimate $T_{regen}$ using a direct calculation $\hat{T}_{regen} = T(s) T_{mc}$, where $T_{mc}$ represents the motor output torque related with the variables in the electric motor dynamics M(s) shown in FIG. 4, such as motor current, combined inertia of rotor and load, and motor speed.

The RBS-ABS event controller in the closed-loop driveline dynamic compensation system 202 may include a feed-forward compensator 162. The feed-forward compensator 162 is utilized to compensate for the driveline, transmission, and electric motor dynamics M(s)T(s) quickly. The feed-forward compensator 162 may be represented by the same transfer function as the pre-compensator in the open loop based driveline RBS-ABS event control system, $C_{pc}(s)$, described above. It also can be chosen as a constant value. If the system includes the feed-forward compensator 162, the feed-forward compensator 162 will be used to compensate for the driveline, transmission, and electric motor dynamics M(s)T(s) quickly while any additional error will be compensated by the feedback loop via the regenerative braking torque compensation controller 156 with the estimated regenerative torque feedback from the regenerative braking torque estimator 158. In a RBS-ABS event controller that does not include the feed-forward compensator 162 (i.e., a system similar to FIG. 4 but which does not include the feed-forward compensator 162), the feedback loop, via the regenerative braking torque compensation controller 156 and the regenerative braking torque estimator 158, may be used to compensate for the driveline, transmission, and electric motor dynamics M(s)T(s). The product of the output control variable of feed-forward compensator $C_{pc}(s)$, block 162, and the output of feedback controller $C_{regen}(s)$, that is, regenerative braking torque compensation controller 156, are then added to RBS-ABS event controller at summation block 164 to produce control variable, $u_{regen}$.

In real hybrid and electric vehicle systems that control the left and right wheels separately, the RBS-ABS event control system 200 may select either the left or right friction braking control variable (i.e., $u_L$ or $u_R$) as the input variable u to the RBS-ABS event control system 200. On a road surface where the coefficient of friction between the road surface and the wheels mu is different at each wheel, it may be desirable to select the friction braking control variable from either left wheel $u_L$ or the right wheel $u_R$ as the input to the RBS-ABS event control system 200 from which of the wheels is experiencing the lowest coefficient of friction between the road surface and the wheels mu or from which of the wheel is experiencing the greatest amount of slip $\lambda$.

An example of a control system that controls the left and right wheels separately is described in U.S. patent application Ser. No. 16/576,274 filed on Sep. 19, 2019, the disclosure of which is hereby incorporated in its entirety by reference herein.

The RBS-ABS event control system 200 may be utilized to control hybrid and electric vehicles with drivelines having different configurations. For example, the RBS-ABS event control system 200 may be utilized to control vehicles having in-wheel motors (individual hub motors). In a system where the vehicle has in-wheel motors, the driveline and transmission dynamics T(s) does not exist physically, which would simplify the RBS-ABS evet control system shown in FIG. 4, i.e., there would be no need to compensate for the driveline and transmission dynamics T(s). An example of vehicles having in-wheel motors is described in U.S. patent application Ser. No. 16/355,084 filed on Mar. 15, 2019, the disclosure of which is hereby incorporated in its entirety by reference herein.

Figure 5:
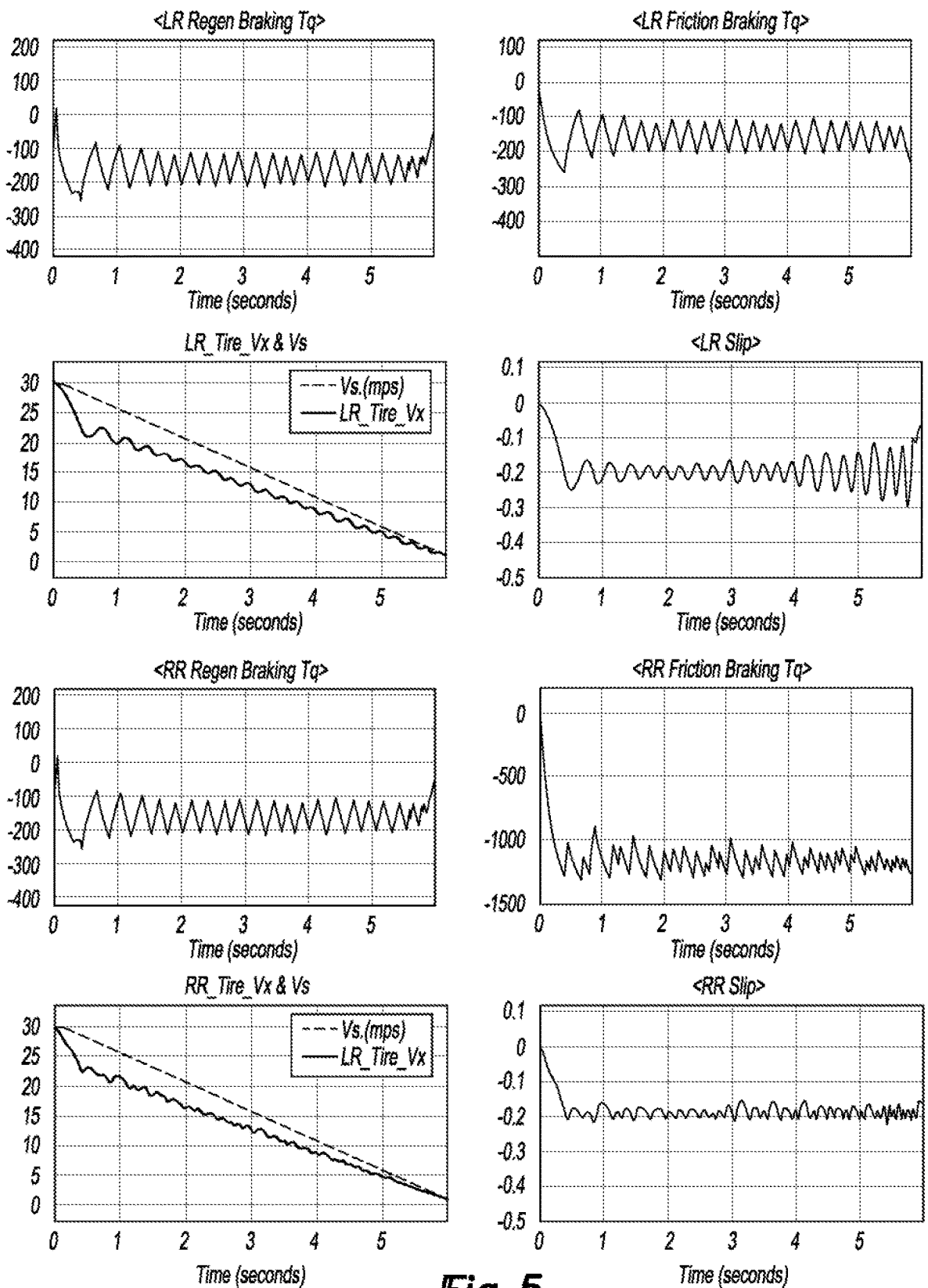
FIG. 5 is a series of graphs that illustrate braking control test results during an anti-lock braking event that utilized the RBS-ABS event control system with closed-loop driveline dynamics compensation.

FIG. 5 illustrates the simulation test curves of the RBS-ABS event control system 200 with the closed loop based compensator. Only two rear wheels test curves are shown because the electric motor delivers regenerative braking torque to the rear wheels by an open differential in this example. The test curves of the left and right wheels include: torque acted on axles which is referred to as regenerative braking torques [Nm], friction braking torques [Nm], vehicle speed Vs [mps], wheel speed Vx [mps], and wheel slips. The left wheel/tire is on a low friction mu road surface and the static value in its slip-friction curve is 0.2. The right wheel/tire is in a high friction mu road surface and the static value in its slip-friction curve is 0.8.

As shown in FIG. 5, the initial vehicle speed value is 30 [mps]. When the ABS is activated at t=0, the RBS-ABS control is applied. During braking, RBS-ABS event control system 200 maintains the wheel slip at the reference value −0.2 by automatically adjusting the regenerative braking and friction braking torque control variables. The regenerative braking torque and friction braking torque are integrated by using RBS-ABS event controller during vehicle braking operation. The wheel slip control response is quick, the vehicle stability is maintained, and the vehicle's stop distance is at the same level when compared with the original ABS control test shown in FIG. 6, where only ABS control is applied without regenerative braking. The original ABS control test is also are illustrated in U.S. patent application Ser. No. 16/576,274 filed on Sep. 19, 2019 and U.S. patent application Ser. No. 16/576,233 filed on Sep. 19, 2019, the disclosures of which both are hereby incorporated in their entirety by reference herein.

Figure 6:
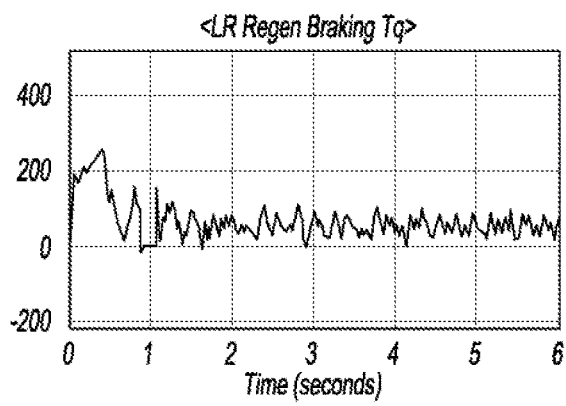
FIG. 6 is a series of graphs that illustrate braking control test results during an anti-lock braking event where anti-lock braking control is applied in the absence of regenerative braking.
Figure 6:
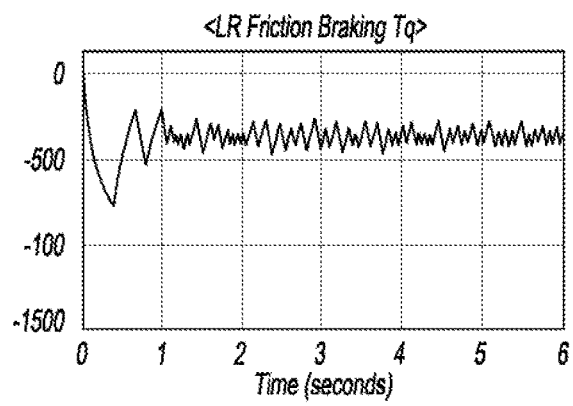
Figure 6:
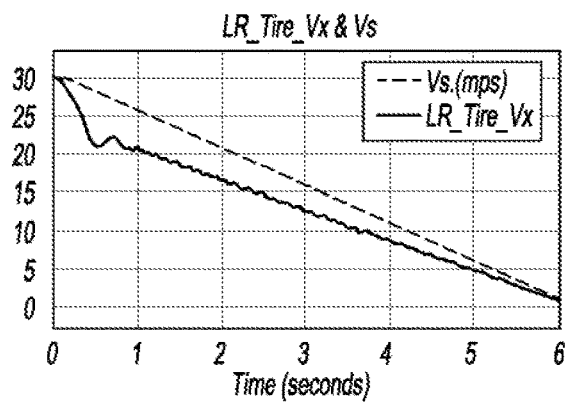
Figure 6:
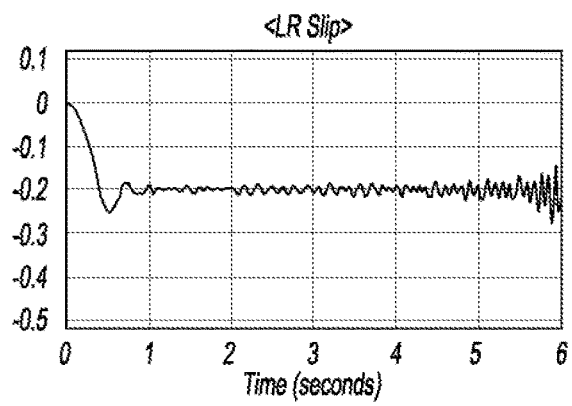
Figure 6:
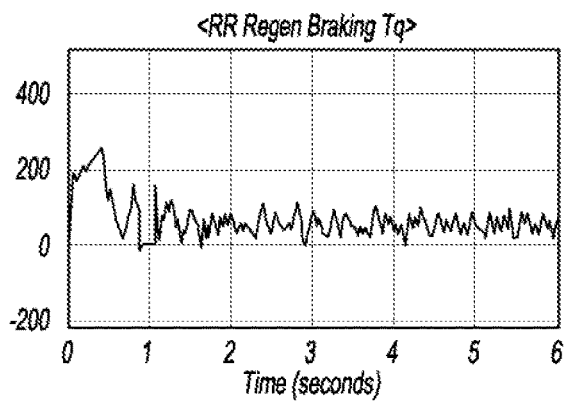
Figure 6:
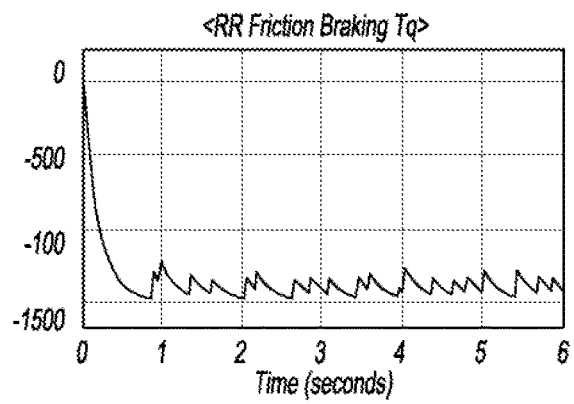
Figure 6:
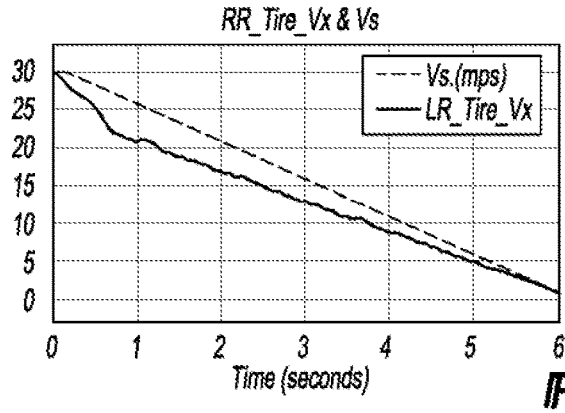
Figure 6:
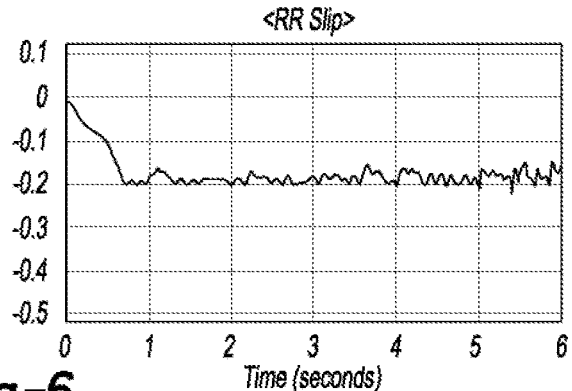

FIG. 6 illustrates the simulation test curves of the ABS control application only. In FIG. 6, ABS control maintains the wheel slip at the reference value −0.2 during braking and vehicle decelerating. It is noticed that the value of regenerative braking torque is positive value in FIG. 6 which is affected by the driveline dynamics. Strictly speaking, it should be referred to as torque on axle because it is not regenerative braking torque rather a reaction torque on axles when regenerative braking torque command is zero.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
an electric machine configured to recharge a battery during regenerative braking;
friction brakes configured to apply torque to wheels of the vehicle to slow the vehicle;
a drivetrain having a transmission; and
a controller programmed to, in response to and during an anti-locking braking event,
  (a) brake the vehicle via generating a signal indicative of a total torque demand based on a difference between (i) a desired wheel slip ratio and (ii) an actual wheel slip ratio,
  (b) maintain or drive actual wheel slip at or toward the desired wheel slip via adjusting a regenerative braking torque of the electric machine based on
    (i) a product of (A) the signal and (B) a regenerative braking weighting coefficient and
    (ii) a pre-compensator that is based on a transfer function corresponding to friction braking system dynamics,
  (c) maintain or drive actual wheel slip at or toward the desired wheel slip via adjusting a friction braking torque of the friction brakes based on a product of (i) the signal and (ii) a friction braking weighting coefficient,
  (d) maintain or drive actual wheel slip at or toward the desired wheel slip via further adjusting the regenerative braking torque of the electric machine based on a closed-loop control, wherein the closed loop control includes adjusting the regenerative braking torque based on
    (i) a difference between
      (A) the product of (I) the signal, (II) the regenerative braking weighting coefficient, and (III) the pre-compensator, and
      (B) an estimated regenerative braking torque, and
    (ii) a regenerative braking torque compensation control block, and
  (e) maintain or drive actual wheel slip at or toward the desired wheel slip via further adjusting the regenerative braking torque of the electric machine based on a feed-forward compensator, wherein the feed-forward compensator is based on transfer functions that represent dynamics of the electric machine, dynamics of the friction brakes, and dynamics of the drivetrain and transmission of the vehicle.

2. The vehicle of claim 1, wherein the estimated regenerative braking torque is based on an electrical current being generated by the electric machine and a speed of the vehicle wheel and a wheel slip.

3. The vehicle of claim 1, wherein the regenerative braking torque compensation control block is one of a PID controller, an adaptive model predictive controller, a fuzzy logic controller, or a neural network controller.

4. A vehicle comprising:
an axle having an input shaft connected to an open differential and output shaft extending out of the open differential;
wheels secured to each output shaft;
an electric machine secured to the input shaft and configured to slow the vehicle during regenerative braking;
friction brakes disposed about the wheels and configured to slow the vehicle; and
a controller programmed to, in response to and during an anti-locking braking event,
  (a) brake the vehicle via generating a signal indicative of a total torque demand based on a difference between (i) a desired wheel slip ratio and (ii) an actual wheel slip ratio,
  (b) maintain or drive actual wheel slip at or toward the desired wheel slip via adjusting a regenerative braking torque of the electric machine based on a product of (i) the signal and (ii) a first weighting coefficient during the anti-locking braking event,
  (c) maintain or drive actual wheel slip at or toward the desired wheel slip via adjusting a friction braking torque of the friction brakes based on a product of (i) the signal and (ii) a second weighting coefficient during the anti-locking braking event,
  (d) maintain or drive actual wheel slip at or toward the desired wheel slip via further adjusting the regenerative braking torque based on a closed-loop control that includes (i) a regenerative braking torque compensation control block and (ii) a feedback control, and
  (e) maintain or drive actual wheel slip at or toward the desired wheel slip via further adjusting the regenerative braking torque of the electric machine based on a feed-forward compensator.

5. The vehicle of claim 4, wherein the feedback control includes adjusting the regenerative braking torque based on
  (a) a difference between
    (i) the product of (A) the signal and (B) the regenerative braking weighting coefficient and
    (ii) a pre-compensator that is based on a transfer function corresponding to friction braking system dynamics, and
  (b) an estimated regenerative braking torque.

6. The vehicle of claim 5, wherein the estimated regenerative braking torque is based on an electrical current being generated by the electric machine.

7. The vehicle of claim 6, wherein the estimated regenerative braking torque is further based on a speed of the vehicle wheel and a wheel slip.

8. The vehicle of claim 4, wherein the regenerative braking torque compensation control block is a PID controller.

9. The vehicle of claim 4, wherein the regenerative braking torque compensation control block is an adaptive model predictive controller.

10. The vehicle of claim 4, wherein the regenerative braking torque compensation control block is a fuzzy logic controller.

11. The vehicle of claim 4, wherein the regenerative braking torque compensation control block is a neural network controller.

12. The vehicle of claim 4, wherein the feed-forward compensator is based on transfer functions that represent dynamics of the electric machine, dynamics of the friction brakes, and dynamics of a drivetrain and a transmission of the vehicle.

13. A vehicle comprising:
an electric machine configured to recharge a battery during regenerative braking;
friction brakes configured to apply torque to wheels of the vehicle and slow the vehicle; and
a controller programmed to, in response to and during an anti-locking braking event,
  (a) brake the vehicle via generating a signal indicative of a total torque demand based on a difference between (i) a desired wheel slip ratio and (ii) an actual wheel slip ratio,
  (b) maintain or drive actual wheel slip at or toward the desired wheel slip via adjusting a regenerative braking torque of the electric machine based on a product of (i) the signal and (ii) a regenerative braking weighting coefficient,
  (c) maintain or drive actual wheel slip at or toward the desired wheel slip via adjusting a friction braking torque of the friction brakes based on a product of (i) the signal and (ii) a friction braking weighting coefficient, and
  (d) maintain or drive actual wheel slip at or toward the desired wheel slip via further adjusting the regenerative braking torque of the electric machine based on a closed-loop control.

14. The vehicle of claim 13, wherein the closed-loop control includes adjusting the regenerative braking torque based on a difference between
  (a) the product of (i) the signal and the (ii) regenerative braking weighting coefficient and
  (b) an estimated regenerative braking torque.

15. The vehicle of claim 14, wherein the estimated regenerative braking torque is based on an electrical current being generated by the electric machine.

16. The vehicle of claim 15, wherein the estimated regenerative braking torque is further based on a speed of the vehicle.

17. The vehicle of claim 14, wherein the closed-loop control includes further adjusting the regenerative braking torque based on a regenerative braking torque compensation control block.

18. The vehicle of claim 17, wherein the regenerative braking torque compensation control block is one of a PID controller, an adaptive model predictive controller, a fuzzy logic controller, or a neural network controller.

19. The vehicle of claim 13, wherein the controller is programmed to maintain or drive actual wheel slip at or toward the desired wheel slip via further adjusting the regenerative braking torque of the electric machine based on a feed-forward compensator.

20. The vehicle of claim 19, wherein the feed-forward compensator is based on transfer functions that represent dynamics of the electric machine, dynamics of the friction brakes, and dynamics of a drivetrain and a transmission of the vehicle.

* * * * *